Nov. 12, 1963     C. I. JONES     3,110,853
ELECTRICAL CONTROL APPARATUS
Filed June 5, 1958     2 Sheets-Sheet 1

WITNESSES
Leon J. Vaza
James F. Young

INVENTOR
Clarence I. Jones
BY R. J. Brodahl
ATTORNEY

United States Patent Office 3,110,853
Patented Nov. 12, 1963

3,110,853
ELECTRICAL CONTROL APPARATUS
Clarence I. Jones, Monroeville, Pa., assignor to Westinghouse Electric Corporation, East Pittsburgh, Pa., a corporation of Pennsylvania
Filed June 5, 1958, Ser. No. 740,161
6 Claims. (Cl. 318—312)

The present invention relates in general to control systems for prime mover apparatus and more particularly to electrical control systems operative in a digital manner and in accordance with a reference or desired operation as determined by a suitable control signal that is controlled in accordance with the reference or desired operation of said apparatus.

It is an object of the present invention to provide an improved electrical control system operative as a digital control system and utilizing a reference control signal including a plurality of pulses having a frequency controlled in accordance with some reference or desired operation of the apparatus to be controlled, which may be a motor or other prime mover device.

It is a different object of the present invention to provide improved electrical control apparatus for controlling the operation of a motor or other prime mover device in accordance with a reference or desired operation signal that may comprise a plurality of pulses having a frequency controlled in accordance with some reference or desired operation of the prime mover device.

It is an additional object to provide improved electrical and digitally operative control apparatus for a motor or similar device and operative in accordance with each of a reference or desired operation first control signal and a motor operation sensing second control signal, which first and second control signals together are used to control the operation of the motor or other device as may be desired.

It is a further object of the present invention to provide improved electrical control apparatus for a motor or other device which apparatus is more accurate and stable in operation relative to providing the desired control or regulation of said motor or other device.

These and other objects and advantages of the present invention will become still more apparent from a study of the following description taken in conjunction with the drawings wherein.

Figure 1:
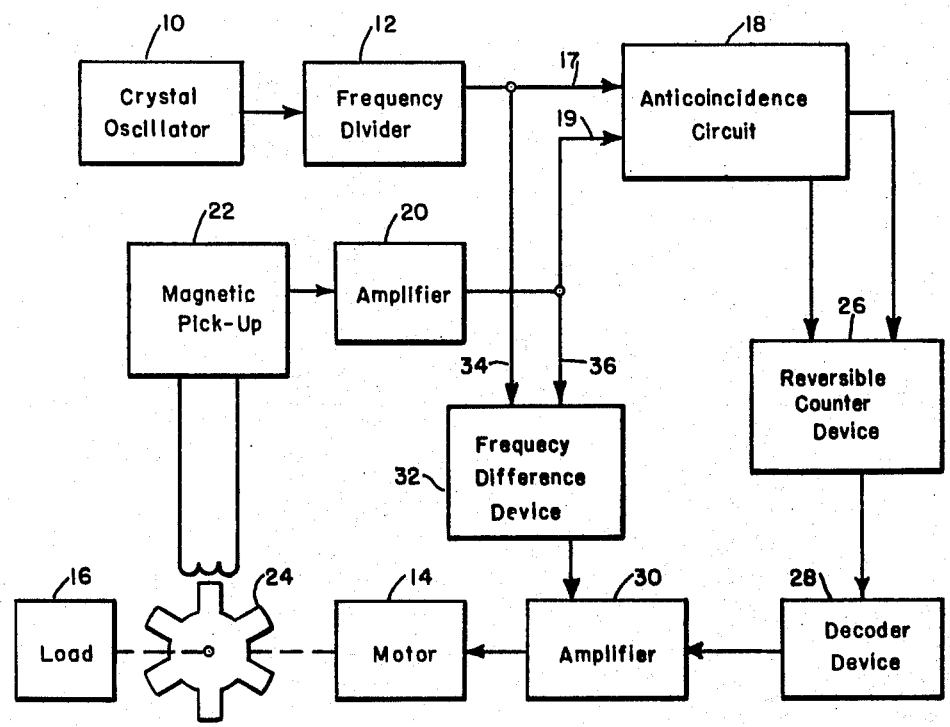
FIGURE 1 is a schematic showing of electrical control apparatus in accordance with the present invention.

The control apparatus shown in FIG. 1 includes a crystal oscillator 10 providing a plurality of control pulses having a substantially constant and fixed frequency as determined by the crystal in the crystal oscillator 10 and as well known to persons skilled in this art. A frequency divider 12 is connected to receive the constant frequency output pulses from the crystal oscillator 10 and to vary the frequency as may be desired for controlling the operation of a motor 14 or like prime mover relative to a load 16 carried by that motor 14. In this regard the frequency divider 12 may be in accordance with the teachings of copending application, Serial No. 683,764 filed September 13, 1957 entitled "Selectable Frequency Reference" by C. I. Jones and R. I. Van Nice and assigned to the same assignee as is the present application.

The output pulses from the frequency divider 12 are supplied to a first input 17 of an anti-coincidence circuit 18. A second input 19 of the anti-coincidence circuit 18 is supplied pulses from an amplifier 20 and a magnetic or the like pickup device 22 operative to sense the operating condition of the motor 14 through a driven tooth member 24 or the like. The anti-coincidence circuit 18 is operative to pass each control signal pulse received from the frequency divider 12 to a reversible counter device 26 through a first input of the reversible counter device 26 for causing the reversible counter device to increase its total count by one unit for each control pulse received from the frequency divider 12. Similarly the anti-coincidence circuit 18 is operative to pass each control signal pulse received from the magnetic pickup device 22 through to the reversible counter device through a second input of the reversible counter device 26 for causing a decrease in the count of the counter device 26 for each pulse received from the magnetic pickup device 22 and the amplifier 20. However, upon the substantial coincidence of a pulse from the frequency divider 12 relative to a pulse from the magnetic pickup device 22, neither of the latter pulses pass through to the reversible counter device 26 such that upon the substantial coincidence of these respective control pulses no change is made in the total count of the reversible counter device 26.

The output of the reversible counter device 26 in digital form is changed to an analogue form in a decoder device 28 which may comprise a conventional digital-to-analogue converter device and such devices are well known to persons skilled in this art and at the present time are readily obtainable in the open market. The output analogue control signal from the decoder device 28 is passed through an amplifier 30 and supplied to a field winding or the armature circuit of the motor 14 for controlling a predetermined operating condition of that motor 14, for example, the operating speed of the motor 14.

A frequency difference device 32 has a first input supplied with the control signal pulses from the frequency divider 12 through a connection 34. The frequency difference device 32 has a second input supplied with control signal pulses from the magnetic pickup device 22 through a connection 36. The output of the frequency difference device 32 is in the form of an analogue control signal having a value or magnitude which varies in accordance with the difference between the pulse frequency of the control signal pulses received from the frequency divider 12 as compared with the pulse frequency of the control signals received from the magnetic pickup device 22. For example, if the frequency of the control signal pulses received from the frequency divider 12 is greater than the frequency of the control signal pulses received from the magnetic pickup device 22 this corresponds to an actual operating condition of the motor 14 such that the desired operating condition, for example speed, is greater than the actual operatnig condition and the output control signal from the frequency difference device 32 may for example be a positive voltage and be operative to increase the operating condition, for example speed, of the motor 14.

On the other hand, if the frequency of the actual condition control signal from the magnetic pickup device 22 is greater than the frequency of the reference signal from the frequency divider 12, then the frequency difference device 32 may be operative to provide a negative voltage control signal to the motor 14 for decreasing the speed of the motor 14.

Figure 2:
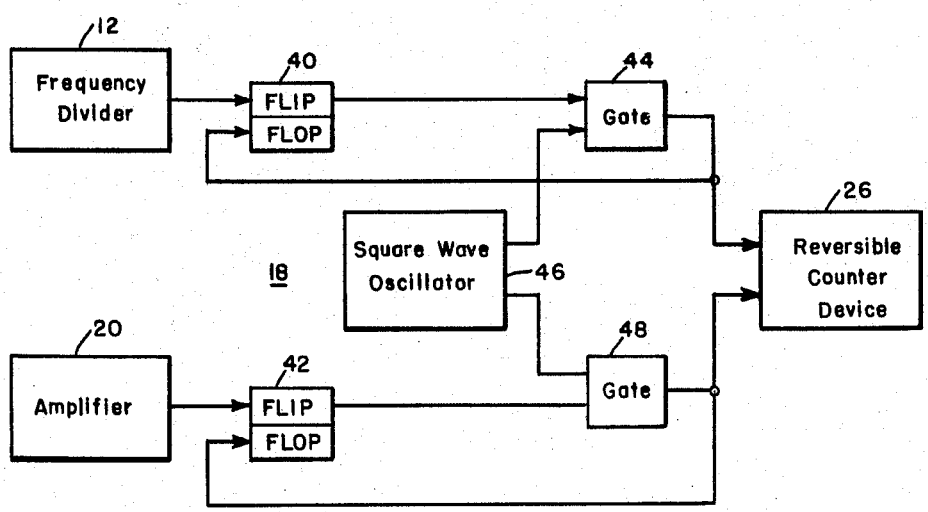
FIG. 2 is a schematic showing of one form of the anti-coincidence circuit shown in FIG. 1.

In FIG. 2 there is shown a schematic circuit arrangement of one form, for purposes of illustration only, of the anti-coincidence circuit 18 such that a first flip-flop device 40 is supplied with the reference control signal from the frequency divider 12 and a second flip-flop device 42 is supplied with the actual operating condition signal pulses from the amplifier 20. The output signal from the flip-flop 40 is supplied to a gate circuit 44 which is controlled such that it passes the output pulse from the flip-flop 40 in accordance with a signal from the square wave oscillator 46. Thusly, when a control signal is supplied by the frequency divider 12, the flip-flop 40 will provide a corresponding output pulse through the gate circuit 44 as determined by the square wave oscillator 46. Similarly when a control pulse is received from the amplifier 20 the flip-flop 42 will supply an output pulse to the gate circuit 48 which will also be controlled by the oscillator 46 and out of phase with the opening of the gate circuit 44. Thus only one pulse at a time can be supplied to the counter device 26.

Figure 3:
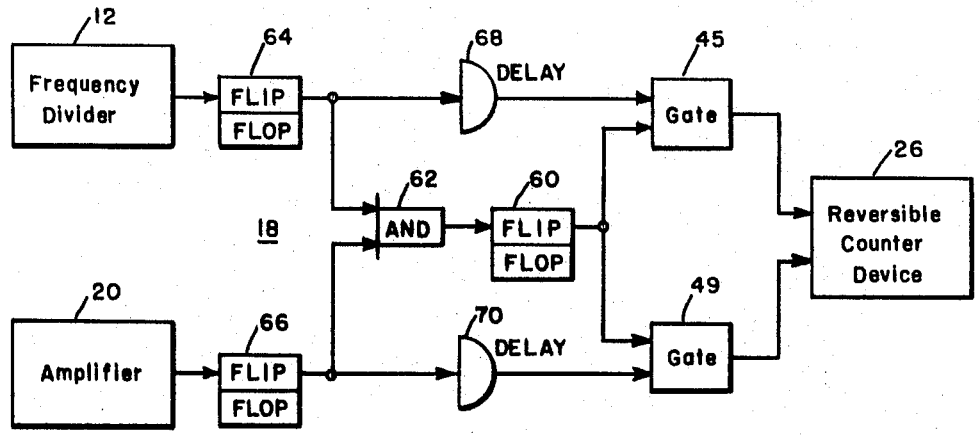
FIG. 3 is a different suitable modification of the anti-coincidence circuit shown in FIG. 1.

The modified anti-coincidence device shown in FIG. 3 is operative such that the monostable flip-flop 60 provides an output inhibiting pulse to the gate circuits 45 and 49 only upon the simultaneous occurrence of control signal pulses from each of the frequency divider 12 and the amplifier 20 due to the operation of the AND device 62 to provide an output pulse only at this time. Otherwise, the pulses from the respective flip-flop devices 64 and 66 pass through the respective delay devices 68 and 70 and through the respective otherwise open gate circuits 45 and 49 to the counter device 26. In this regard the pulse period of each of the flip-flops 64 and 66 may be in the order of 20 microseconds as is the delay period of each of the delay devices 68 and 70. The pulse period of the flip-flop 60 may be in the order of 50 microseconds.

Thusly the anti-coincidence device shown in FIG. 2 is operative as an interrogation type of device, and the one shown in FIG. 3 is operative as a pulse cancelling type of device to prevent in effect a count operation by the subsequent counter device 26 when two input pulses to be counted substantially coincide.

In the operation of the control apparatus as shown in FIG. 1 the crystal oscillator 10 provides a plurality of control pulses having a substantially fixed or constant frequency to the frequency divider 12. The output of the frequency divider 12 is a series of positive pulses whose repetition rate is predetermined as desired for providing the desired control of the motor 14. In this regard, the output pulses from the frequency divider 12 may have a repetition rate of any integer less than the frequency rate of the crystal oscillator 10. The reference signal derived by the frequency divider is supplied to one input of the reversible counter device 26 through the anti-coincidence circuit 18 and causes the reversible counter device 26 to increase the count storage one count for each pulse received from the frequency divider 12. The decoder device 28 is operative to sense the count storage of the reversible counter device 26 and supply an analogue signal that is directly proportional to the count stored in the reversible counter 26. This latter analogue signal is amplified through a D.C. amplifier 30 and is used to provide or at least control the operating power for the prime mover 14. This turning activates the magnetic pickup device 22 by means of the toothed wheel member 24 which generates a feedback control signal whose frequency is proportional to the operating speed of the prime mover 14 and thereby the speed of the load 16. A waveshaping amplifier 20 then generates a positive pulse for for each positive half-cycle of the feedback signal. These pulses are returned through the anti-coincidence circuit 18 to a second input of the reversible counter device 26 and cause the counter to decrease its count storage one count for each such pulse supplied. Thus the counter device 26 effectively integrates the load speed error signal which corresponds to the pulse rate difference between the load pulse rate and the reference pulse rate. This is the sum of the difference in the number of pulses between the reference control signal supplied by the frequency divider 12 and the actual load operating condition or feedback control signal received from the magnetic pickup device 22. Any such difference in received pulses is operative to provide an error correcting signal to the decoder device 28. Thusly a zero error signal is provided for steady-state operating conditions.

To provide the desired stability and improved transient response, a second feedback loop including the frequency difference device 32 has been provided and is operative to supply an output voltage proportional to the operating error of the motor 14 as sensed by any frequency difference between the reference control signal received from the frequency divider 12 and the motor operating condition control signal received from the magnetic pickup device 22.

One purpose of the anti-coincidence circuit 18 is to prevent any interference at the inputs of the counter device 26 between the reference control signal pulses and the motor actual operating condition or feedback control signals. In this regard it is designed such that any two pulses which occur close enough together such that they might interfere relative to the operation of the counter device 26 are in effect cancelled.

It is feasible with the disclosed digital system, utilizing a controlled frequency reference signal, to obtain both a calibration accuracy and a 24-hour stability better than one part per million of speed regulation when the control apparatus as shown in FIG. 1 is applied for controlling the operating speed of the motor 14. A transient error in the order of less than 0.01% is similarly feasible.

The digital control system as shown in FIG. 1 has actually been built and tested and displays an accuracy and 24-hour stability in the order of the above amounts.

Figure 4:
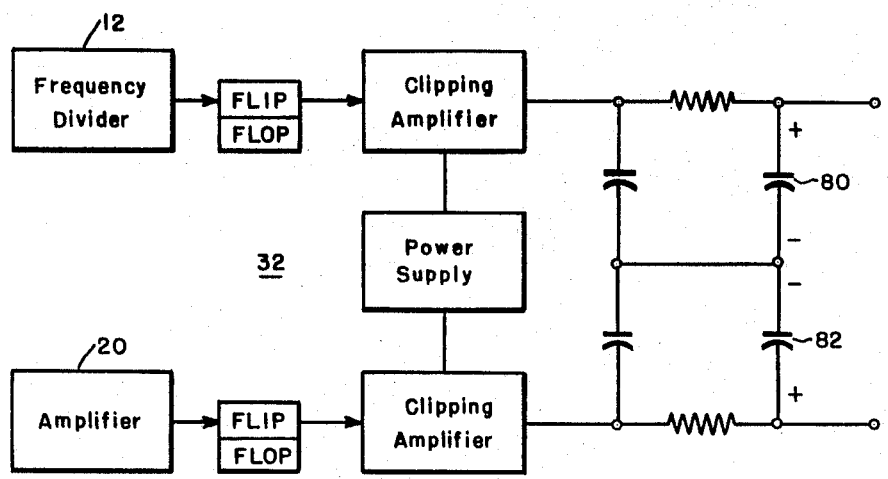
FIG. 4 is an illustrative showing of a suitable frequency difference device as shown in FIG. 1.

In FIGURE 4 there is shown one form of a suitable frequency difference device. The device is operative to build up a voltage across the capacitor 80 that is proportional to the frequency of the reference signal from the frequency divider 12. Similarly a voltage is built up across the capacitor 82 that is proportional to the frequency of the load condition signal from the amplifier 20. The latter voltages are in opposition such that across both capacitors a voltage difference is provided that corresponds to the difference in frequency between the reference signal and the load condition signal.

In this regard it should be noted that the frequency divider 12 may be removed from the present control apparatus and a suitable variable frequency oscillator substituted or even crystal oscillators substituted with one such crystal oscillator being provided for each desired reference control signal pulse frequency.

One advantage of the digital control system as shown in FIG. 1 is the advantage of practically unlimited integration, or in other words, the capacity of the reversible counter device 26 may be made as large or as small as desired and its output may be made to be as large as practically desirable. Therefore the control system can be built with as much gain and as much integration capacity as desired. Further there are no moving parts and therefore practically no maintenance problem is provided.

One illustrative prior art teaching of a suitable form of the reversible counter device 26 can be found in the March 1956 issue of the Electronics magazine, beginning at page 174, and entitled "High-Speed Counter Uses Surface-Barrier Transistor."

Although the invention has been described with a certain degree of particularity, it should be understood that the present disclosure has been made only by way of example and that numerous changes in the details of construction and the combination and arrangement of parts may be resorted to without departing from the scope and the spirit of the present invention. For example, it may become desirable to use a variable frequency oscillator as the reference signal source instead of the crystal oscillator and frequency divider shown in FIG. 1.

I claim as my invention:

1. In control apparatus for a prime mover operative with a load, the combination of a reference signal source for providing reference signal pulses having a predetermined frequency, an operating condition sensing device operatively connected to said prime mover for providing operating condition signal pulses at a frequency in accordance with a predetermined operating condition of said prime mover a, reversible pulse counter device having a first input for increasing the total count of said counter device for each signal pulse applied to said first input and having a second input for decreasing the total count of said counter device for each signal pulse applied to said second input, a first signal comparison device operatively connected between said reference signal source and said first input and operatively connected between said condition sensing device and said second input for providing a predetermined control of the counting operation by said counter device upon the substantially simultaneous coincidence of a reference signal pulse and an operating condition signal pulse, and a prime mover control device adapted to be connected between said counter device and said prime mover for controlling the operation of said prime mover in accordance with the total count of said counter device, and a second signal comparison device operatively connected between said prime mover control device and each of the reference signal source and the operating condition sensing device to be responsive to a predetermined comparison between said reference signal pulses and said operating condition signal pulses for controlling the operation of said prime mover device.

2. In apparatus for controlling the operation of a motor device, the combination of a first control signal source for providing a first control signal in the form of a plurality of pulses having a substantially fixed frequency and in accordance with a predetermined desired operation of said motor device, a second control signal source for providing a second control signal in the form of a plurality of pulses having a frequency which varies in accordance with a predetermined actual operating condition of said motor device, a counter device having a first input for increasing the count of said counter device and having a second input for decreasing the count of said counter device, and a signal comparison device operatively connected between said first control signal source and said first input and between said second control signal source and said second input for preventing a count operation by said counter device upon the coincidence of a first control signal pulse and a second control signal pulse, and a motor control device adapted to be connected between said counter device and said motor device for controlling the operation of said motor device in accordance with the total stored count of said counter device, and a second signal comparison device operatively connected to said motor control device and responsive to a predetermined comparison between the frequency of said first control signal and the frequency of said second control signal for controlling the operation of said motor device.

3. In control apparatus for a prime mover operative with a load, the combination of a reference signal source for providing reference signal pulses having a predetermined frequency, an operating condition sensing device operatively connected to said prime mover for providing operating condition signal pulses at a frequency in accordance with a predetermined operating condition of said prime mover, a signal integrating control device having a first input for increasing the signal integral of said control device for each signal pulse applied to said first input and having a second input for decreasing the signal integral of said control device for each signal pulse applied to said second input, a first signal comparison device operatively connected between said reference signal source and said first input and operatively connected between said condition sensing device and said second input for providing a predetermined control of the integration operation by said control device upon the substantially simultaneous coincidence of a reference signal pulse and an operating condition signal pulse, and a prime mover control device adapted to be connected between said control device and said prime mover for controlling the operation of said prime mover in accordance with the signal integral of said control device, and a second signal comparison device operatively connected to said prime mover control device and responsive to a frequency comparison between said reference signal pulses and said operating condition signal pulses for proportionally controlling the operation of said prime mover device in accordance with any frequency difference between said reference signal pulses and said operating condition signal pulses.

4. In control apparatus for a prime mover operative with a load, the combination of a reference signal source for providing reference signal pulses having a predetermined frequency, an operating condition sensing device operatively connected to said prime mover for providing operating condition signal pulses at a frequency in accordance with a predetermined operating condition of said prime mover, a first control device operative to integrate signals and having a first input for increasing the integral of said first control device for each signal pulse applied to said first input and having a second input for decreasing the integral of said first control device for each signal pulse applied to said second input, a signal coincidence sensing device operatively connected between said reference signal source and said first input and operatively connected between said condition sensing device and said second input for providing a predetermined control of the operation of said first control device upon the substantially simultaneous coincidence of a reference signal pulse and an operating condition signal pulse, and a prime mover control device adapted to be connected between said first control device and said prime mover for controlling the operation of said prime mover in accordance with the integral of said first control device, and a signal comparison device operatively connected to said prime mover control device and responsive to a predetermined comparison between the frequency of said reference signal pulses and the frequency of said operating condition signal pulses for controlling the operation of said prime mover device.

5. In apparatus for controlling the operation of a motor device, the combination of a first control signal source for providing a first control signal in the form of a plurality of pulses having a substantially fixed frequency and in accordance with a predetermined desired operation of said motor device, a second control signal source for providing a second control signal in the form of a plurality of pulses having a frequency which varies in accordance with a predetermined actual operating condition of said motor device, a signal integration device having a first input for increasing the integral of said signal integration device and having a second input for decreasing the integral of said signal integration device, and a signal comparison device operatively connected between said first control signal source and said first input and between said second control signal source and said second input for preventing a responsive operation by said signal integration device upon the coincidence of a first control signal pulse and a second control signal pulse, and a motor control device adapted to be connected between said signal integration device and said motor device for controlling the operation of said motor device in accordance with the signal integral of said signal integration device, and a second signal comparison device operatively connected to said prime mover control device and responsive to a predetermined comparison between the frequency of said first control signal and the frequency of said second control signal for controlling the operation of said motor device.

6. In apparatus for controlling the operation of a motor device, the combination of a first control signal source for providing a first control signal in the form of a plurality of pulses having a substantially fixed frequency and in accordance with a predetermined desired operation of said motor device, a second control signal source for providing a second control signal in the form of a plurality of pulses having a frequency which varies in accordance with a predetermined actual operating condition of said motor device, a first control device operative as a signal integrator and having a first input for increasing the signal integral of said first control device and having a second input for decreasing the signal integral of said first control device, and a signal coincidence sensing device operatively connected between said first control signal source and said first input and between said second control signal source and said second input for preventing a signal integration operation by said first control device upon the coincidence of a first control signal pulse and a second control signal pulse, and a motor control device adapted to be connected between said first control device and said motor device for controlling the operation of said motor device in accordance with the signal integral of said first control device, and a second control device operatively connected to said prime mover control device and responsive to a proportional comparison between the frequency of said first control signal and the frequency of said second control signal for controlling the operation of said motor device in accordance with any frequency difference between said first control signal and said second control signal.

References Cited in the file of this patent
UNITED STATES PATENTS

| | | |
|---|---|---|
| 2,996,649 | Leslie | Aug. 15, 1961 |
| 3,064,173 | Breen et al. | Nov. 13, 1962 |